(12) United States Patent
McAdams et al.

(10) Patent No.: US 12,697,568 B2
(45) Date of Patent: Aug. 4, 2026

---

(54) FILTER LIFE DETECTION VIA DYNAMIC PRESSURE MEASUREMENT

(71) Applicant: Hydration Labs, Inc., Charlestown, MA (US)

(72) Inventors: Abigail McAdams, Charlestown, MA (US); Andrew Jaskey, Charlestown, MA (US)

(73) Assignee: HYDRATION LABS, INC, Charlestown, MA (US)

( * ) Notice: Subject to any disclaimer, the term of this patent is extended or adjusted under 35 U.S.C. 154(b) by 413 days.

(21) Appl. No.: 18/545,987

(22) Filed: Dec. 19, 2023

(65) Prior Publication Data

US 2025/0196031 A1 Jun. 19, 2025

(51) Int. Cl.
B01D 35/143 (2006.01)
B67D 1/12 (2006.01)
(52) U.S. Cl.
CPC ......... B01D 35/1435 (2013.01); B67D 1/125 (2013.01); B67D 2210/0001 (2013.01)
(58) Field of Classification Search
CPC .. B01D 35/1435; B01D 35/143; B01D 34/14; B67D 1/125; B67D 2210/0001; B67D 2210/00005
USPC ................................ 222/129; 210/85, 90, 87
See application file for complete search history.

(56) References Cited

U.S. PATENT DOCUMENTS 4,844,796 A * 7/1989 Plester ...................... C02F 9/20
210/264
6,095,031 A * 8/2000 Warne ...................... A47J 31/52
99/283

6,312,589 B1 * 11/2001 Jarocki ................ B67D 1/0015
210/266
2014/0114469 A1 4/2014 Givens et al.
2020/0031654 A1 1/2020 Wing et al.
2020/0088074 A1 3/2020 Alkhowaiter
2020/0251974 A1 8/2020 Nagaya et al.
2023/0069727 A1 3/2023 Comunale

FOREIGN PATENT DOCUMENTS

WO 9932409 A1 7/1999

OTHER PUBLICATIONS

International Search Report and Written Opinion received in International application No. PCT/US24/60511 mailed on Mar. 4, 2025.

* cited by examiner

*Primary Examiner* — David J Walczak

(74) *Attorney, Agent, or Firm* — Bradley Arant Boult Cummings LLP; Adam J. Thompson

(57) ABSTRACT

A sensor coupled to a computer can sense a pressure of a buffer tank. A computer can determine a start of dispensing a beverage from a beverage dispenser. The computer can determine that an elapsed time from the start of dispensing the beverage reaches a predefined duration threshold. The computer can measure a particular pressure of the buffer tank when determining that the elapsed time reaches the predefined duration threshold. The computer can determine that the particular pressure falls below a predefined pressure threshold. The computer can generate an order to replace a water filter of the beverage dispense in response to the particular pressure at the elapsed time falling below the predefined pressure threshold.

20 Claims, 6 Drawing Sheets

FILTER LIFE DETECTION VIA DYNAMIC PRESSURE MEASUREMENT

TECHNICAL FIELD

The present systems and processes relate generally to automatically estimating the life of a filter within a beverage dispensing system.

BACKGROUND

Beverage dispensing systems are commonly used in restaurants and office buildings to provide consumers with access to a variety of beverage options. In some configurations, beverage dispensing systems include flavoring syrups or additives that are mixed with a diluent liquid to produce a desired beverage. The diluent liquid is most often still or carbonated water. In some instances, water directly from a water source (e.g., city water) contains contaminants which are undesirable in flavored beverages. It is therefore often beneficial to filter the water to remove such contaminants.

A variety of filter types can be used to remove contaminants from the source water. In most cases, however, filters have limited useful life-spans, as over time they can become clogged with filtered out contaminants. Determining whether or not a filter is still effective is therefore a necessary step for ensuring optimal performance of beverage dispensing systems. When filters become near an end-of-life span, the filter may increasingly restrict the flow of water through the filter. When a filter reaches its end-of-life, it is replaced with a new filter. Replacing the filter before it reaches its end-of-life adds unnecessary costs, while replacing the filter after it reaches its end-of-life may prevent the beverage dispensing system from operating properly, Therefore, there is a long-felt but unresolved need for a system or process that allows for computerized detection of filter life in beverage dispensing systems without manual testing.

BRIEF SUMMARY OF THE DISCLOSURE

Briefly described, and according to one embodiment, aspects of the present disclosure generally relate to systems and processes for automated filter life detection based on dynamic pressure measurement. In a beverage dispensing system containing a water source, a filter, and a buffer tank connected in series, the system pressure is in part dependent on the quality of the water filter. Specifically, if the filter is no longer functional (e.g., clogged, or damaged), the system pressure measured downstream of the filter decreases relative to the baseline system pressure. For example, when the filter is located between the water source and the buffer tank, a non-functional filter may cause decreased pressure downstream. By measuring the pressure at specified time points relative to the start and end of beverage dispensation, it is therefore possible to determine whether or not the filter needs to be replaced.

The system can generate a predictive model to estimate the remaining life of a filter. Specifically, the system can iteratively measure system pressures at particular points relative to dispensation throughout the lifetime of the filter and estimate the remaining useful life of the filter based on the trajectory of system pressure measurements and patterns of dispensed volumes over time.

BRIEF DESCRIPTION OF THE FIGURES

The accompanying drawings illustrate one or more embodiments and/or aspects of the disclosure and, together with the written description, serve to explain the principles of the disclosure. Wherever possible, the same reference numbers are used throughout the drawings to refer to the same or like elements of an embodiment, and wherein.

DETAILED DESCRIPTION

Figure 1A:
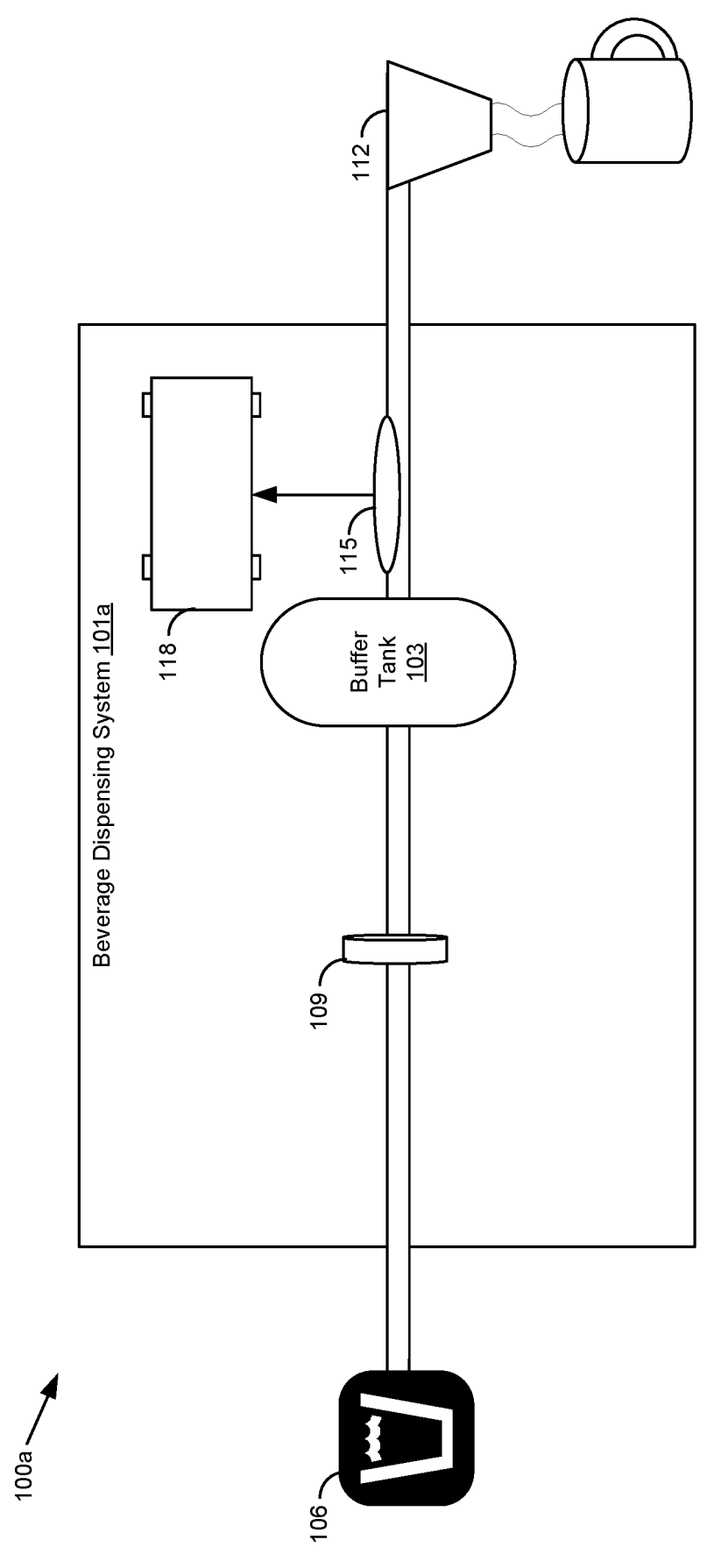
FIG. 1A illustrates a beverage dispensing environment according to various embodiments of the present disclosure.

For the purpose of promoting an understanding of the principles of the present disclosure, reference will now be made to the embodiments illustrated in the drawings and specific language will be used to describe the same. It will, nevertheless, be understood that no limitation of the scope of the disclosure is thereby intended; any alterations and further modifications of the described or illustrated embodiments, and any further applications of the principles of the disclosure as illustrated therein are contemplated as would normally occur to one skilled in the art to which the disclosure relates. All limitations of scope should be determined in accordance with and as expressed in the claims.

Whether a term is capitalized is not considered definitive or limiting of the meaning of a term. As used in this document, a capitalized term shall have the same meaning as an uncapitalized term, unless the context of the usage specifically indicates that a more restrictive meaning for the capitalized term is intended. However, the capitalization or lack thereof within the remainder of this document is not intended to be necessarily limiting unless the context clearly indicates that such limitation is intended.

Overview

Aspects of the present disclosure generally relate to systems and processes for automated filter life detection based on dynamic pressure measurement. In a beverage dispensing system containing a water source, a filter, and a buffer tank connected in series, the system pressure is in part dependent on the quality of the water filter. Specifically, if the filter between the water source and the buffer tank is no longer functional (e.g., clogged, or damaged), the system pressure measured downstream of the filter decreases relative to the baseline system pressure. By measuring the pressure at specified time points relative to the start and end of beverage dispensation, it is therefore possible to determine whether or not the filter needs to be replaced.

The present disclosure relates to a system for generating a predictive model to estimate the remaining life of a filter. Specifically, the system can iteratively measure system pressures at particular points relative to dispensation throughout the lifetime of the filter and estimate the remaining useful life of the filter based on the trajectory of system pressure measurements and patterns of dispensed volumes over time. The predictive model can be generated and stored within the beverage dispensing system, or within a remote server which can aggregate data across multiple devices.

Exemplary Embodiments

Referring now to the figures, for the purposes of example and explanation of the fundamental processes and components of the disclosed systems and processes, reference is made to FIG. 1A, which illustrates an exemplary overview of a beverage dispensing environment 100a according to various embodiments of the present disclosure of the filter life detection system. As will be understood and appreciated, the beverage dispensing environment 100a shown in FIG. 1A represents merely one approach or embodiment of the present system, and other aspects are used according to various embodiments of the present system.

The beverage dispensing environment 100a includes a beverage dispensing system 101a. The beverage dispensing system 101a can be a soft drink dispenser, a water dispenser, or other type of beverage dispensing system. The beverage dispensing system 101a can include various additives, such as flavored syrups and various liquids. The beverage dispensing system 101a can combine one or more of the additives with at least one of one or more base liquids to create the particular mixed drink. For example, the beverage dispensing system 101a can include a lime-coconut flavored syrup. Continuing this example, the beverage dispensing system 101a can mix the lime-coconut flavored syrup with carbonated water to create a carbonated lime-coconut beverage. The beverage dispensing system 101a can include a buffer tank 103 that can hold any particular liquid for use in dispensing a beverage from the beverage dispensing system 101a. For example, the buffer tank 103 can hold water. In one embodiment, the buffer tank 103 can hold the desired beverage liquid (e.g., water, carbonated water), the additive for the particular beverage, or a combination thereof. In other embodiments, the additive and/or carbonation can be added subsequent to the buffer tank 103, such as via a nozzle.

The buffer tank 103 can be connected via conduit to a liquid source 106 which supplies liquid to the buffer tank. The liquid source 106 can be a separate reservoir, a building water supply, or other source of liquid. For example, the buffer tank can be connected via conduit to the building water supply. The beverage dispensing system 101a can include a filter 109 disposed between the liquid source 106 and the buffer tank 103. The filter 109 can be a reverse osmosis filter, a charcoal filter, or any other suitable filter for removing substances, such as impurities, from the source liquid. In an exemplary embodiment, building water (supplied by the local water utility) is purified via a reverse osmosis filter and used to fill the buffer tank 103. The beverage dispensing system 101a can further include a dispensing nozzle 112 connected via conduit downstream of the buffer tank 103. The dispensing nozzle 112 can be configured to combine flavors and liquids from different sources to create a mixed beverage. The beverage dispensing system 101a can include one or more pressure sensors 115 configured to measure the pressure of the liquid in the system at one or more locations within the fluid path of the beverage dispensing system 101a. The pressure sensor 115 can be positioned upstream of the filter 109, between the filter 109 and the buffer tank 103, on or in the buffer tank 103, and/or between the buffer tank 103 and the dispensing nozzle 112. In one embodiment, the pressure sensor 115 is configured to measure the pressure between the buffer tank and the dispensing nozzle 112.

The beverage dispensing system 101a can include at least one computing device 118 communicably coupled to the pressure sensor 115. The computing device 118 can include a microprocessor, a computer, a server, or other suitable computing device. The computing device 118 can be within the beverage dispensing system 101a or remotely coupled to the beverage dispensing system 101a via a network. The computing device 118 can be configured to determine the quality or remaining life of the filter 109 based on the measurements from the pressure sensor 115. For example, if the measured system pressure at a particular time relative to beverage dispensation falls below a specified threshold, the computing system 118 can determine that the filter 109 is no longer functioning properly and needs to be replaced. The computing system 118 can further be configured to generate an order a replacement filter 109. As an example, the computing system can transmit a request to ship a replacement filter 109 to an address associated with the beverage dispensing system 101a.

Figure 1B:
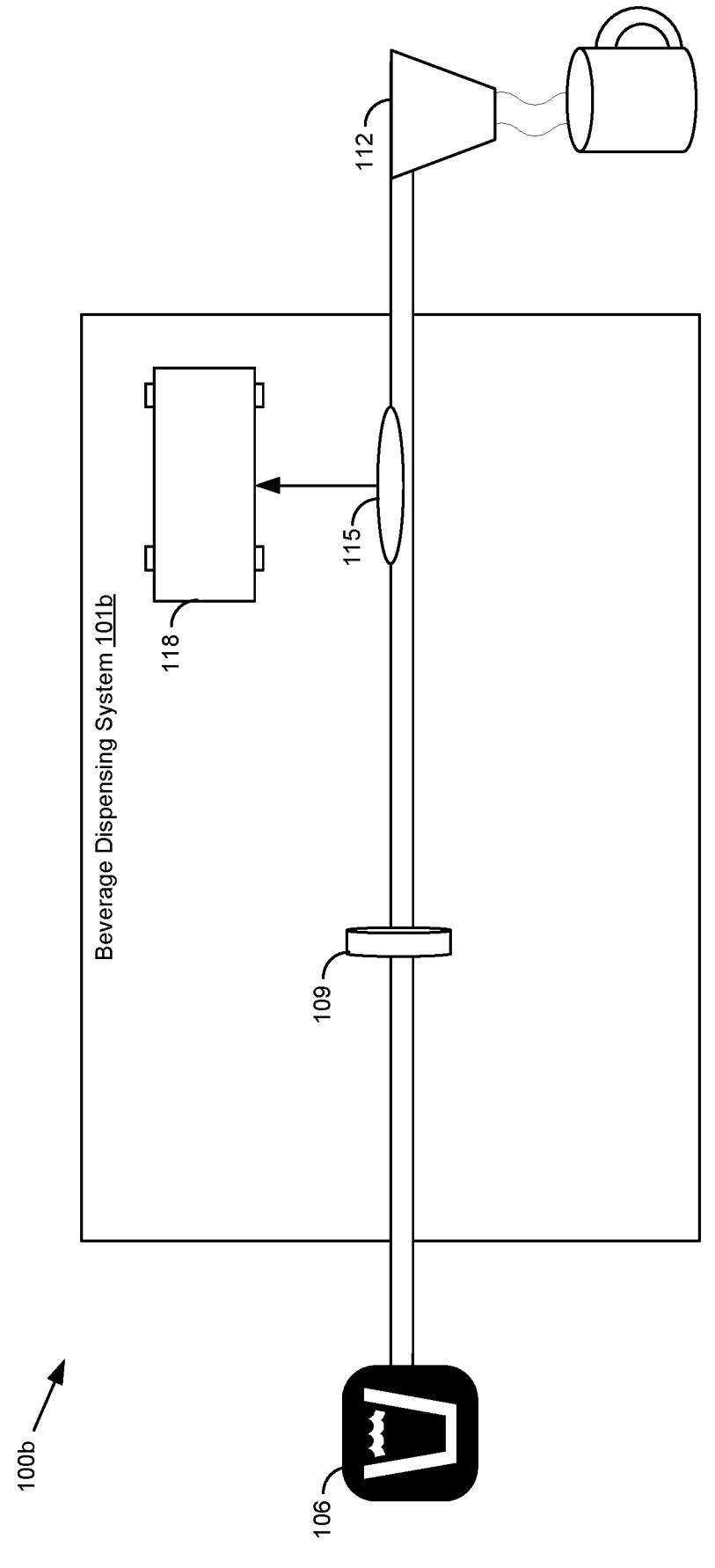
FIG. 1B illustrates a beverage dispensing environment according to various embodiments of the present disclosure.

Referring now to FIG. 1B, depicted is an exemplary embodiment of a beverage dispensing environment 100b according to various embodiments of the present disclosure. The beverage dispensing environment 100b can include a beverage dispensing system 101b. In one example, the beverage dispensing system 100b is a beverage dispensing system 100a omitting a buffer tank 103. The beverage dispensing system 101b can include a liquid source 106 which supplies liquid to the beverage dispensing system 101b. The liquid source 106 can be connected via a conduit to a dispensing nozzle 112 without a buffer tank disposed in between. The beverage dispensing system 101b can include a filter 109 disposed between the liquid source 106 and the dispensing nozzle 112. The beverage dispensing system 101b can include one or more pressure sensors 115 configured to measure the pressure of the liquid in the system at one or more locations within the fluid path of the beverage dispensing system 101b. The pressure sensor 115 can be positioned upstream of the filter 109, between the filter 109 and dispensing nozzle 112, or at any other location within the system suitable for measuring the pressure of liquid in the system. The beverage dispensing system 101b can include at least one computing device 118 communicably coupled to the pressure sensor 115. The computing device 118 can be configured to determine the quality or remaining life of the filter 109 based on the measurements from the pressure sensor 115.

Figure 2:
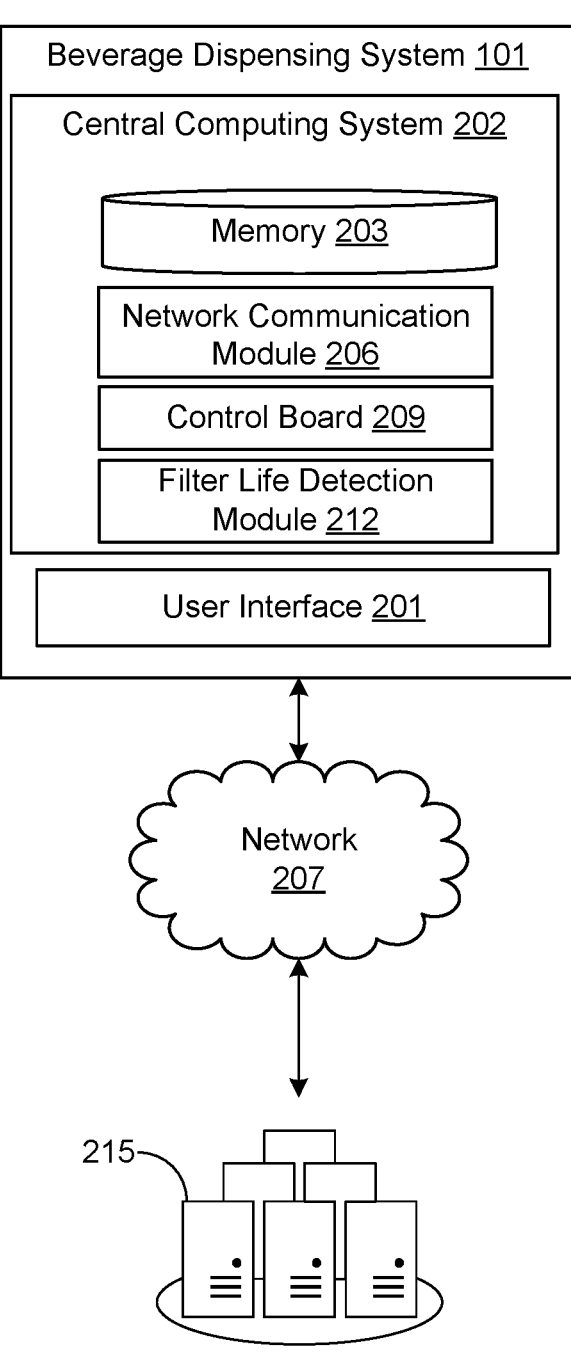
FIG. 2 illustrates a beverage dispensing environment according to various embodiments of the present disclosure.

Referring now to FIG. 2, depicted is an exemplary system architecture for the beverage dispensing system 101. The beverage dispensing system 101 can include a user interface 201 for receiving user selections. The beverage dispensing system 101 can correspond to beverage dispensing system 101a or 101b. The user interface 201 can be a series of buttons, a collection of dispensing levers, and/or a touch screen. For example, the user interface 201 can be a touch screen display which presents the user with various icons representing different beverage options. The beverage dispensing system 101 can include a central computing system 202 configured to control the general operation of the beverage dispensing system 101. The user interface can include a motion sensor to detect placement of a receptacle to receive a beverage. The central computing system 202 can be a microprocessor, a computer, a server, or other suitable computing device. The central computing system 202 can include a memory 203, a network communication module 206, and a control board 209. The memory 203 can store information related to beverage options, remaining amounts of liquid and flavor, user preferences, temperatures, pressures, and other important system variables. The network communication module 206 can allow the beverage dispensing system 101 to communicate with external computing systems 215 via a network 207. The network communication module can be a Wi-Fi dongle, an Ethernet communication port, or other suitable network communication device. The network can be a local area network (LAN), a wide area network (WAN), the internet, or other suitable network.

The control board 209 can control various valves, pumps, and sensors within the beverage dispensing system to create and dispense the appropriate beverage selected by the user. The control board 209 can be a microprocessor, a motherboard, or other suitable control board. In an exemplary embodiment, the control board 209 receives user inputs from the user interface 201 corresponding to a particular beverage to be dispensed. The control board 209 initiates beverage dispensation by opening valves corresponding to the appropriate liquids and flavorings and engaging a demand pump which delivers the beverage to the dispensing nozzle 112 for user consumption.

The beverage dispensing system can further include a filter life detection module 212. The filter life detection module 212 can be a part of the central computing system 202 or a separate computing device. The filter life detection module 212 can be resident within the beverage dispensing system 101 or communicatively coupled to the network communication module 206 via the network 207. In one embodiment, the filter life detection module 212 resides within the beverage dispensing system. The filter life detection module 212 can receive inputs from the central computing system 202 corresponding to start and end times for dispensation. The filter life detection module 212 can receive direct inputs from the pressure sensor 115. The filter life detection module 212 can use the direct inputs to make a determination as to the status of the filter 109 according to processes 300, 400, and 500 (described in detail with reference to FIG. 3, FIG. 4, and FIG. 5 below), among other processes described herein. The determination can then be communicated via the network communication module 206.

In one embodiment, the filter life detection module 212 is resident on a central server in a remote location relative to the beverage dispensing system 101. The central computing system 202 receives measurements from various sensors, including pressure sensor 115 and communicates relevant information via the network communication module 206 to the filter life detection module 212. The filter life detection module 212 then makes determinations as to the status of the filter 109 according to processes 300, 400, and 500 (described in detail with reference to FIG. 3, FIG. 4, and FIG. 5 below).

Figure 3:
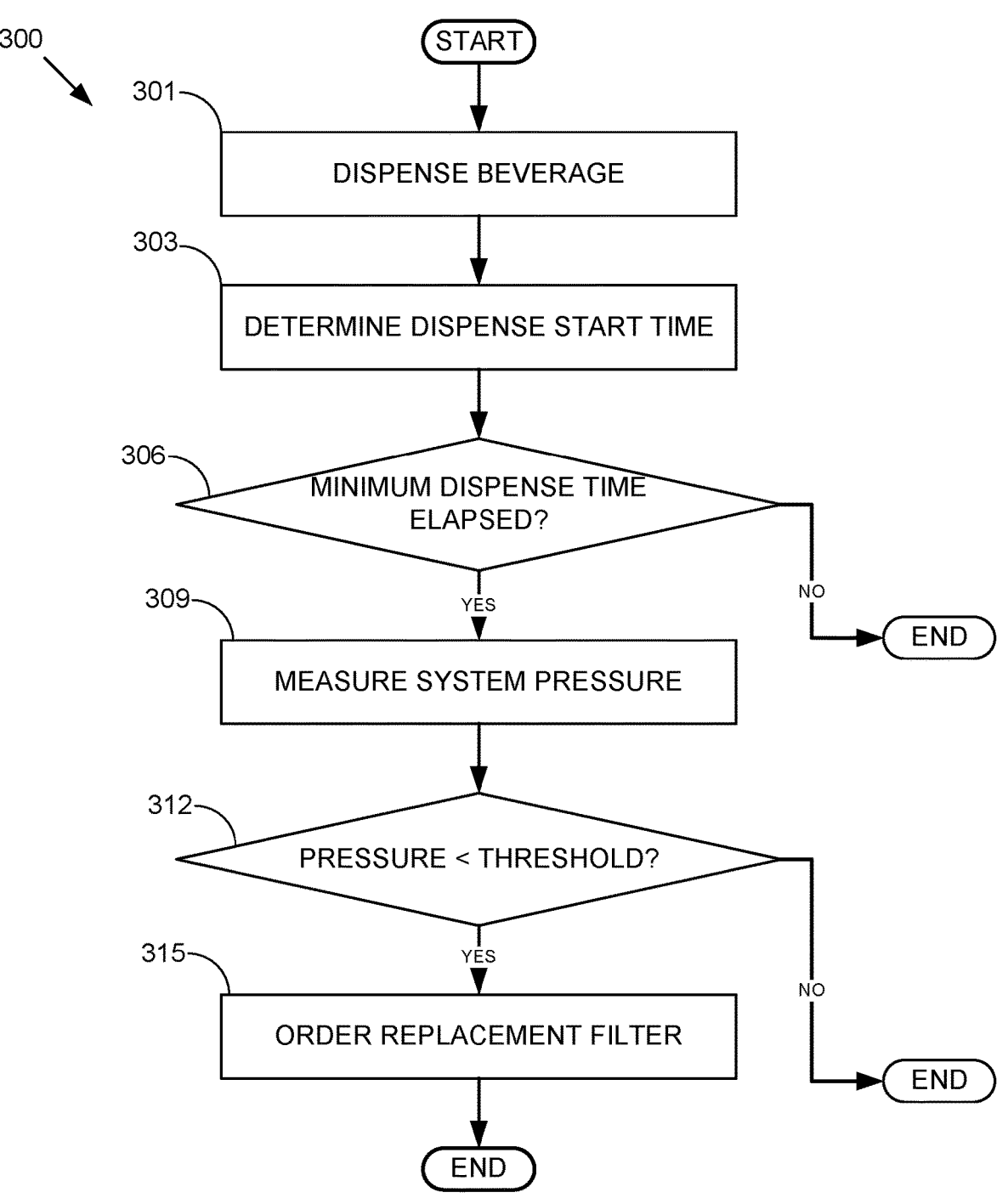
FIG. 3 illustrates an example flowchart of certain functionality implemented by portions of the beverage dispensing environment according to various embodiments of the present disclosure.

As will be understood by one having ordinary skill in the art, the steps and processes shown in FIG. 3 (and those of all other flowcharts and sequence diagrams shown and described herein) may operate concurrently and continuously, are generally asynchronous and independent, and are not necessarily performed in the order shown.

Referring now to FIG. 3, shown is an exemplary process 300 for determining the status of the filter 109 according to one embodiment of the present disclosure. At step 301, the process 300 can include dispensing a beverage. For example, the beverage dispensing system 101 dispenses a beverage. At step 303 the filter life detection module 212 determines the start time of the beverage dispensation. The beverage dispensing system 101 can measure the time as an absolute time (e.g., according to the time of day) or relative time (e.g., relative to another event or the start of the dispensation).

At step 306, the process 300 can include determining whether an amount of time has elapsed since the start of dispensation. For example, the filter life detection module 212 can determine whether an elapsed time relative to the start of dispensation has elapsed. The filter life detection module 212 can determine whether the dispensation has continued for a period of one second following initiation. In one embodiment, the filter life detection module 212 can determine the dispensation start time by receiving a demand pump run time and an end time, converting the demand pump run time to a value in seconds to determine a run time in seconds, and subtracting the run time in seconds from the end time to determine the start time. The demand pump run time and end time can be provided to the filter life detection module 212 via an inlet solenoid.

At step 309, the process 300 can include receiving a pressure measurement from the pressure sensor 115. For example, if the dispensation duration has reached the predefined threshold, the filter life detection module 212 can receive a pressure measurement from the pressure sensor 115. In some embodiments, the filter life detection module 212 can receive pressure measurements from the sensor 115 at a frequency regardless of whether a beverage is dispensed and select a closest measurement for analysis. If the dispensation duration has not reached the predefined threshold, the beverage dispensing system 101 can refrain from receiving a pressure measurement. The pressure measurement signal received by the filter life detection module 212 can be an analog voltage, or a digital representation of a pressure value in pounds per square inch (PSI).

In some embodiments, the filter life detection model 212 can review a history of pressure readings from the sensor 115 and determine a closest reading to a threshold time from the start of a known beverage dispense. The filter life detection model 212 can determine whether the closest reading is before an end of dispensing the beverage. The filter life detection model 212 can use the closest reading of the pressure for the known beverage dispense.

At step 312, the process 300 can include comparing the measured pressure to a predefined pressure threshold. For example, the filter life detection module 212 can compare the measured pressure to a predefined pressure threshold. If the measured pressure is below the predefined pressure threshold (e.g., 10 pounds per square inch), the filter life detection module 212 can determine that the filter 109 of the beverage dispensing system 101 is no longer functional and needs to be replaced. In some embodiments, the filter life detection module 212 can compare the measured pressure to multiple predefined pressure thresholds. The filter life detection module 212 can identify a particular life expectancy bin for the filter 109 from a set of life expectancy bins based on the comparison. In one example, the life expectancy bins can include 1) at or above 60 PSI is for a first filter bin, 2) below 60 PSI but at or above 40 PSI is a second filter bin, 3) below 40 PSI but at or above 20 PSI is a third filter bin, 4) below 20 PSI but at or above 10 PSI is a fourth filter bin, and below 10 PSI is a fifth bin. In this example, the filter life detection module 212 can determine the fourth bin corresponds to when the filter life detection module 212 can order a new filter 109 and the fifth bin corresponds to when the filter life detection module 212 determines the filter 109 is no longer being functional.

At step 315, the process can include generating an order to replace the filter 109. in response to determining that the filter 109 is no longer functional, the filter life detection module can generate an order to replace the filter 109. The filter life detection module 212 can generate a notification for the user indicating that the filter needs to be replaced. The filter life detection module 212 can automatically generate a purchase order for the replacement filter. The term "automatically" is used herein to refer to an action that happens via a computer without user interaction.

Figure 4:
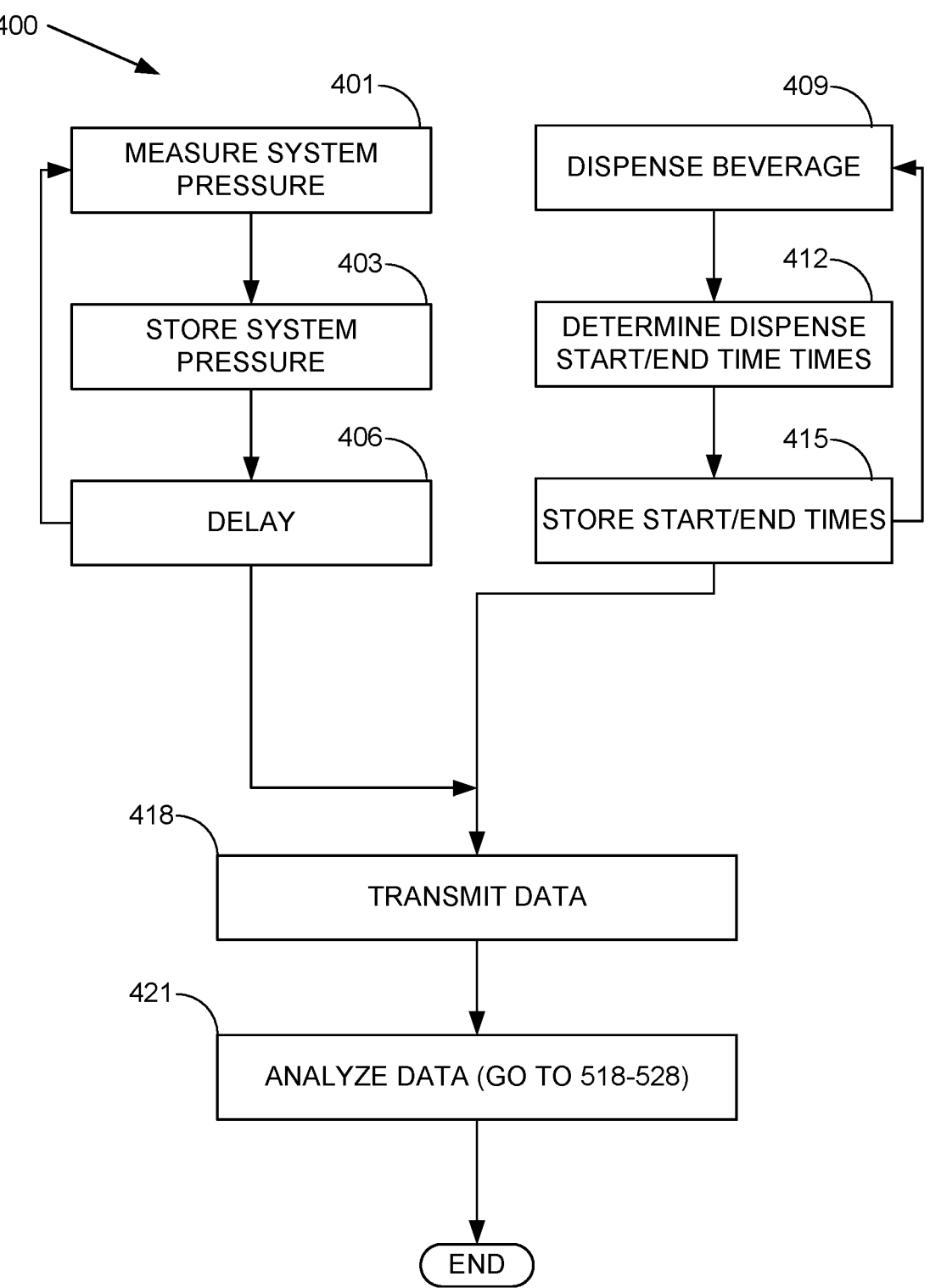
FIG. 4 illustrates an example flowchart of certain functionality implemented by portions of the beverage dispensing environment according to various embodiments of the present disclosure.

Referring now to FIG. 4, depicted is an exemplary method for determining the filter life of a beverage dispensing system 101 wherein the filter life detection module 212 is not resident within the beverage dispensing system 101. In an iterative process, the beverage dispensing system 101 can repeatedly measure the system pressure via the pressure sensor 115 (step 401), store the system pressure (step 403), and delay at a predefined sampling rate (e.g., one sample per second, step 406). Simultaneously, the beverage dispensing system can dispense beverages (step 409) measure dispensation start and end times (step 412), and store them (step 415) throughout normal operation. At predefined intervals, at step 418, the beverage dispensing system can transmit pressure and dispensation data to a filter life detection module 212 resident on a remote server. The remote filter life detection module 212 can identify pressure measurements taken at particular times relative to dispenses. For example, the remote filter life detection module 212 can determine which pressure measurements correspond most closely to periods one second following the initiation of dispensations. At step 421, the remote filter life detection module can then compile the set of pressure measurements to generate plots and predictive models analogous to those generated according to steps 518-527 of process 500 (described below in connection with FIG. 5).

Figure 5:
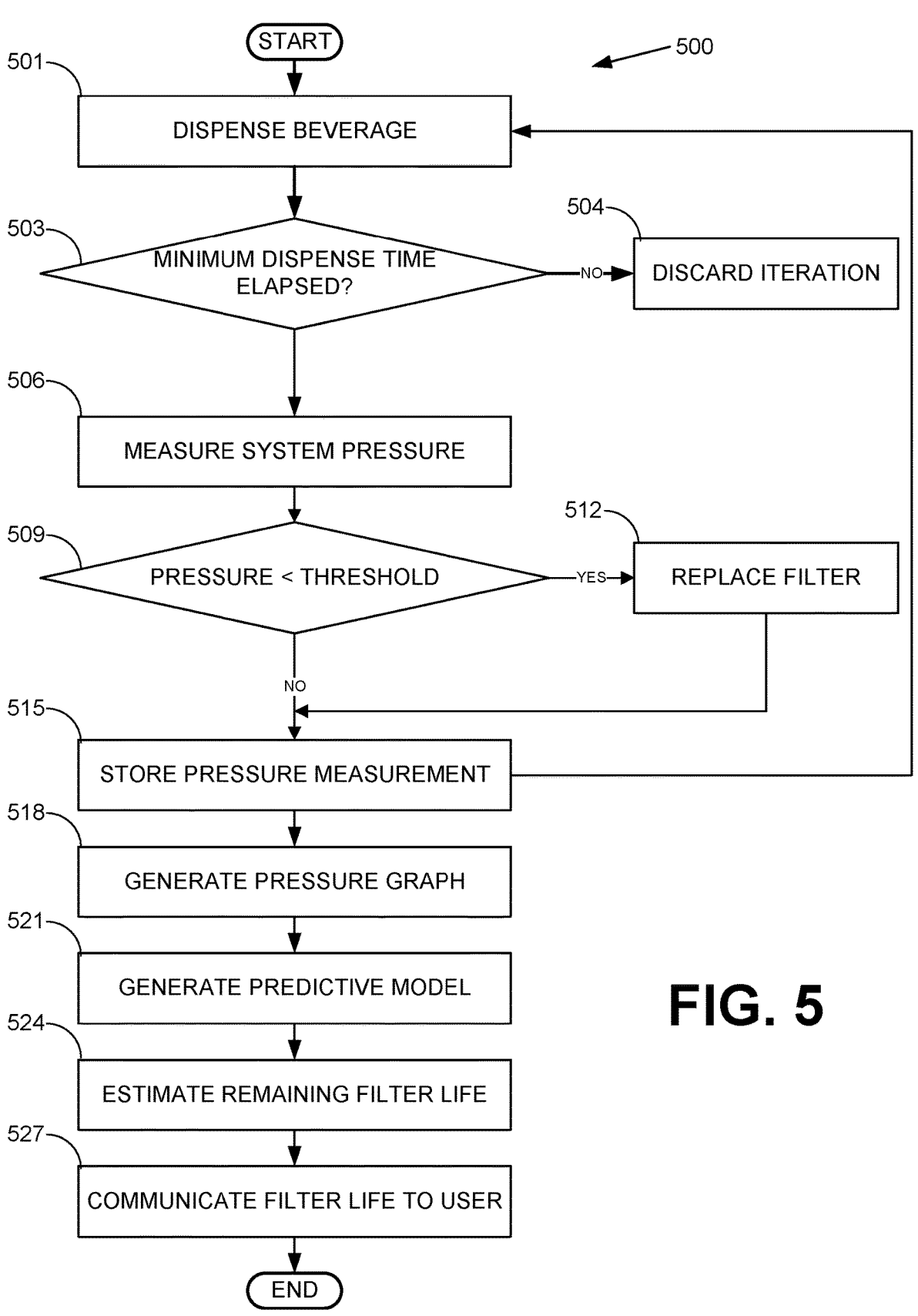
FIG. 5 illustrates an example flowchart of certain functionality implemented by portions of the beverage dispensing environment according to various embodiments of the present disclosure.

Referring now to FIG. 5, depicted is an exemplary process 500 for generating a predictive model to estimate the life of a filter 109 within the beverage dispensing system 101. At step 501, the beverage dispensing system 101 can initiate beverage dispensation in response to a user request. The filter life detection module 212 can determine the time at which dispensation began. At step 503, the filter life detection module 212 can determine whether a predetermined amount of time (e.g., one second) has elapsed following the start of dispensation. If the predetermined time has elapsed, at step 506, the filter life detection module can obtain a measurement of the system pressure from the pressure sensor 115. At step 509, the filter life detection module can determine whether the measured pressure has fallen below a predefined pressure threshold (e.g., 10 PSI). At step 512, if the pressure has fallen below the predefined pressure threshold, the filter life detection module can issue an order to replace the filter 109. At step 515, the measurements can be stored by the filter life detection module.

Steps 501-515 can be repeated iteratively. Further, the filter life detection module 212 can, at each iteration, discard measurements if the elapsed time fails to reach the predefined threshold. At step 518, the filter life detection module 212 can generate a graph showing the pressure measurements at each iteration as a function of time. The generated graph can be displayed to the user via the user interface 201 of the beverage dispensing system 101. Alternatively, the generated graph can be communicated via the network communication module 206 to a remote server and stored for further processing.

At step 521, the filter life detection module 212 can generate a predictive model based on the iteratively recorded pressure measurements. The predictive model can generate a prediction of subsequent pressure measurements as a function of time. The predictive model can be a linear regression model, a neural network, a machine learning model, or other suitable predictive model. At step 524, the predictive model can estimate a future time at which the measured pressure will fall below the predefined pressure threshold. This estimated time corresponds to the estimated remaining life of the filter 109. At step 527, the filter life detection module 212 can communicate the estimated remaining life of the filter 109 to the user. In an exemplary embodiment, the filter life detection module 212 can store the estimated remaining filter life, and update it with additional iterations of dispensation cycles. Further, the filter life detection module 212 can be configured to automatically generate an order for a replacement filter at the time of the estimated end of life for the filter.

In additional embodiments, the filter life detection module 212 can use additional information to assist in estimating the remaining filter life. For example, the remote filter life detection module 212 can determine a volume of fluid dispensed during dispensation. Volume calculation can be accomplished by directly measuring the flow rate of the liquid in the system and multiplying by the duration of each dispensation as computed by the filter life detection module 212. Alternatively, volume dispensed can be determined based on an estimated average flow rate in the system. The filter life detection module 212 can use the computed volume to determine the total volume of beverages dispensed since the last time the filter 109 was replaced. The total volume of beverages dispensed can be used to calculate a volume of dispensation per day by the beverage dispenser. The volume dispensed per day can be correlated with the pressure measurements to determine the relationship between volume of liquid dispensed and filter degradation. This relationship can be used to estimate the estimated lifespan of a filter on a per-machine basis based on the typical use of each machine.

The filter life detection module 212 can additionally include information as to the date of the most recent filter change. The date of the most recent filter change can be used to determine the current age of the filter, which can help in estimating the remaining life of the filter.

From the foregoing, it will be understood that various aspects of the processes described herein are software processes that execute on computer systems that form parts of the system. Accordingly, it will be understood that various embodiments of the system described herein are generally implemented as specially-configured computers including various computer hardware components and, in many cases, significant additional features as compared to conventional or known computers, processes, or the like, as discussed in greater detail herein. Embodiments within the scope of the present disclosure also include computer-readable media for carrying or having computer-executable instructions or data structures stored thereon. Such computer-readable media can be any available media which can be accessed by a computer, or downloadable through communication networks. By way of example, and not limitation, such computer-readable media can comprise various forms of data storage devices or media such as RAM, ROM, flash memory, EEPROM, CD-ROM, DVD, or other optical disk storage, magnetic disk storage, solid state drives (SSDs) or other data storage devices, any type of removable non-volatile memories such as secure digital (SD), flash memory, memory stick, etc., or any other medium which can be used to carry or store computer program code in the form of computer-executable instructions or data structures and which can be accessed by a general purpose computer, special purpose computer, specially-configured computer, mobile device, etc.

When information is transferred or provided over a network or another communications connection (either hardwired, wireless, or a combination of hardwired or wireless) to a computer, the computer properly views the connection as a computer-readable medium. Thus, any such connection is properly termed and considered a computer-readable medium. Combinations of the above should also be included within the scope of computer-readable media. Computer-executable instructions comprise, for example, instructions and data which cause a general purpose computer, special purpose computer, or special purpose processing device such as a mobile device processor to perform one specific function or a group of functions.

Those skilled in the art will understand the features and aspects of a suitable computing environment in which aspects of the disclosure may be implemented. Although not required, some of the embodiments of the claimed systems may be described in the context of computer-executable instructions, such as program modules or engines, as described earlier, being executed by computers in networked environments. Such program modules are often reflected and illustrated by flow charts, sequence diagrams, exemplary screen displays, and other techniques used by those skilled in the art to communicate how to make and use such computer program modules. Generally, program modules include routines, programs, functions, objects, components, data structures, application programming interface (API) calls to other computers whether local or remote, etc. that perform particular tasks or implement particular defined data types, within the computer. Computer-executable instructions, associated data structures and/or schemas, and program modules represent examples of the program code for executing steps of the methods disclosed herein. The particular sequence of such executable instructions or associated data structures represent examples of corresponding acts for implementing the functions described in such steps.

Those skilled in the art will also appreciate that the claimed and/or described systems and methods may be practiced in network computing environments with many types of computer system configurations, including personal computers, smartphones, tablets, hand-held devices, multi-processor systems, microprocessor-based or programmable consumer electronics, networked PCs, minicomputers, mainframe computers, and the like. Embodiments of the claimed system are practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

An exemplary system for implementing various aspects of the described operations, which is not illustrated, includes a computing device including a processing unit, a system memory, and a system bus that couples various system components including the system memory to the processing unit. The computer will typically include one or more data storage devices for reading data from and writing data to. The data storage devices provide nonvolatile storage of computer-executable instructions, data structures, program modules, and other data for the computer.

Computer program code that implements the functionality described herein typically comprises one or more program modules that may be stored on a data storage device. This program code, as is known to those skilled in the art, usually includes an operating system, one or more application programs, other program modules, and program data. A user may enter commands and information into the computer through keyboard, touch screen, pointing device, a script containing computer program code written in a scripting language or other input devices (not shown), such as a microphone, etc. These and other input devices are often connected to the processing unit through known electrical, optical, or wireless connections.

The computer that effects many aspects of the described processes will typically operate in a networked environment using logical connections to one or more remote computers or data sources, which are described further below. Remote computers may be another personal computer, a server, a router, a network PC, a peer device or other common network node, and typically include many or all of the elements described above relative to the main computer system in which the systems are embodied. The logical connections between computers include a local area network (LAN), a wide area network (WAN), virtual networks (WAN or LAN), and wireless LANs (WLAN) that are presented here by way of example and not limitation. Such networking environments are commonplace in office-wide or enterprise-wide computer networks, intranets, and the Internet.

When used in a LAN or WLAN networking environment, a computer system implementing aspects of the system is connected to the local network through a network interface or adapter. When used in a WAN or WLAN networking environment, the computer may include a modem, a wireless link, or other mechanisms for establishing communications over the wide area network, such as the Internet. In a networked environment, program modules depicted relative to the computer, or portions thereof, may be stored in a remote data storage device. It will be appreciated that the network connections described or shown are exemplary and other mechanisms of establishing communications over wide area networks or the Internet may be used.

While various aspects have been described in the context of a preferred embodiment, additional aspects, features, and methodologies of the claimed systems will be readily discernible from the description herein, by those of ordinary skill in the art. Many embodiments and adaptations of the disclosure and claimed systems other than those herein described, as well as many variations, modifications, and equivalent arrangements and methodologies, will be apparent from or reasonably suggested by the disclosure and the foregoing description thereof, without departing from the substance or scope of the claims. Furthermore, any sequence(s) and/or temporal order of steps of various processes described and claimed herein are those considered to be the best mode contemplated for carrying out the claimed systems. It should also be understood that, although steps of various processes may be shown and described as being in a preferred sequence or temporal order, the steps of any such processes are not limited to being carried out in any particular sequence or order, absent a specific indication of such to achieve a particular intended result. In most cases, the steps of such processes may be carried out in a variety of different sequences and orders, while still falling within the scope of the claimed systems. In addition, some steps may be carried out simultaneously, contemporaneously, or in synchronization with other steps.

Aspects, features, and benefits of the claimed devices and methods for using the same will become apparent from the information disclosed in the exhibits and the other applications as incorporated by reference. Variations and modifications to the disclosed systems and methods may be effected without departing from the spirit and scope of the novel concepts of the disclosure.

It will, nevertheless, be understood that no limitation of the scope of the disclosure is intended by the information disclosed in the exhibits or the applications incorporated by reference; any alterations and further modifications of the described or illustrated embodiments, and any further applications of the principles of the disclosure as illustrated therein are contemplated as would normally occur to one skilled in the art to which the disclosure relates.

The foregoing description of the exemplary embodiments has been presented only for the purposes of illustration and description and is not intended to be exhaustive or to limit the devices and methods for using the same to the precise forms disclosed. Many modifications and variations are possible in light of the above teaching.

The embodiments were chosen and described in order to explain the principles of the devices and methods for using the same and their practical application so as to enable others skilled in the art to utilize the devices and methods for using the same and various embodiments and with various modifications as are suited to the particular use contemplated. Alternative embodiments will become apparent to those skilled in the art to which the present devices and methods for using the same pertain without departing from their spirit and scope. Accordingly, the scope of the present devices and methods for using the same is defined by the appended claims rather than the foregoing description and the exemplary embodiments described therein.

Clause 1. A system, comprising: a sensor configured to sense a pressure of a buffer tank; and at least one computing device communicably coupled to the sensor, wherein the at least one computing device is configured to: determine a start of dispensing a beverage from a beverage dispenser; determine that an elapsed time from the start of dispensing the beverage reaches a predefined duration threshold; measure a particular pressure of the buffer tank when determining that the elapsed time reaches the predefined duration threshold; determine that the particular pressure falls below a predefined pressure threshold; and in response to the particular pressure at the elapsed time falling below the predefined pressure threshold, generate an order to replace a water filter of the beverage dispense.

Clause 2. The system of clause 1 or any other clause herein, wherein the at least one computing device is further configured to: determine a second start of dispensing a second beverage from the beverage dispenser; and determine whether a second elapsed time from the second start of dispensing the second beverage reaches the predefined duration threshold.

Clause 3. The system of clause 2 or any other clause herein, wherein the at least one computing device is further configured to in response to completion of dispensing the second beverage before the second elapsed time reaches the predefined duration threshold, refrain from measuring a pressure of the buffer tank.

Clause 4. The system of clause 2 or any other clause herein, wherein the at least one computing device is further configured to determine the start of dispensing the beverage from the beverage dispenser by: receiving a demand pump run time and an end time; converting the demand pump run time to seconds to determine a run time seconds; and subtracting the run time seconds from the end time to determine a time of the start of dispensing.

Clause 5. The system of clause 4 or any other clause herein, wherein the demand pump run time and the end time are received from an inlet solenoid.

Clause 6. The system of clause 1 or any other clause herein, wherein the predefined pressure threshold is 10 pounds per square inch (PSI).

Clause 7. The system of clause 1 or any other clause herein, wherein a first computing device of the at least one computing device is configured to store data comprising a plurality of measurements at the beverage dispenser, and a second computing device of the at least one computing device is configured to: read the data comprising the plurality of measurements; and analyze the data to at least: determine the start of dispensing the beverage and determine that the particular pressure falls below the predefined pressure threshold.

Clause 8. The system of clause 7 or any other clause herein, wherein the beverage dispenser comprises the first computing device and the second computing device comprises a remote server.

Clause 9. A method, comprising: determining, via one of one or more computing devices, a start of dispensing a beverage from a beverage dispenser; determining, via one of the one or more computing devices, that an elapsed time from the start of dispensing the beverage reaches a predefined duration threshold; measuring, via one of the one or more computing devices, a particular pressure of a buffer tank when determining that the elapsed time reaches the predefined duration threshold; determining, via one of the one or more computing devices, that the particular pressure falls below a predefined pressure threshold; and determining, via one of the one or more computing devices, to replace a water filter of the beverage dispenser based on the particular pressure at the elapsed time falling below the predefined pressure threshold.

Clause 10. The method of clause 9 or any other clause herein, further comprising: determining, via one of the one or more computing devices, a volume of fluid dispensed from the beverage dispenser since the last time the water filter was replaced; and calculating, via one of the one or more computing devices, a volume per day value for the beverage dispenser.

Clause 11. The method of clause 10 or any other clause herein, further comprising generating, via one of the one or more computing devices, a plot of total volume dispensed versus pressure based on the volume per day value and the particular pressure.

Clause 12. The method of clause 9 or any other clause herein, wherein measuring the particular pressure of the buffer tank when determining that the elapsed time reaches the predefined duration threshold further comprises: identifying, via one of the one or more computing devices, a particular measurement from a plurality of temporally sequential measurements recorded at a particular interval that is temporally closest to when the elapsed time reaches the predefined duration threshold.

Clause 13. The method of clause 12 or any other clause herein, further comprising determining that the particular measurement falls between the start of dispensing the beverage from the beverage dispenser and an end of dispensing the beverage from the beverage dispenser.

Clause 14. The method of clause 9 or any other clause herein, further comprising analyzing a plurality of recorded pressures to generate a prediction of a time when a pressure at the predefined duration threshold will pass the predefined pressure threshold, wherein the plurality of recorded pressures comprises the particular pressure.

Clause 15. The method of clause 14 or any other clause herein, further comprising receiving an indication of when the water filter was installed in the beverage dispenser, wherein the prediction of the time is generated based on the indication of when the water filter was installed in the beverage dispenser.

Clause 16. A system, comprising: a sensor configured to sense a pressure of a buffer tank; and at least one computing device communicably coupled to the sensor, wherein the at least one computing device is configured to iteratively: determine a respective start of dispensing a current iteration beverage from a beverage dispenser; determine whether a respective elapsed time from the start of dispensing the current iteration beverage reaches a predefined duration threshold; and if the respective elapsed time reaches the predefined duration threshold: measure a current iteration pressure of the buffer tank; determine whether the current iteration pressure falls below a predefined pressure threshold; and if the current iteration pressure falls below the predefined pressure threshold, determine to replace a water filter of the beverage dispense.

Clause 17. The system of clause 16 or any other clause herein, wherein the at least one computing device is further configured to discard measurements related to a current iteration if the respective elapsed time fails to reach the predefined duration threshold.

Clause 18. The system of clause 16 or any other clause herein, wherein the at least one computing device is further configured to iteratively record a current iteration pressure as a plurality of recorded pressures when the respective elapsed time reaches the predefined duration threshold.

Clause 19. The system of clause 18 or any other clause herein, wherein the at least one computing device is further configured to generate a graph showing the plurality of recorded pressures over time.

Clause 20. The system of clause 18 or any other clause herein, wherein the at least one computing device is further configured to: perform a regression analysis on the plurality of recorded pressures to determine a predictive formula for future pressure readings; and generate a prediction of a time when the pressure at the predefined duration threshold will pass the predefined pressure threshold based on the predictive formula.

These and other aspects, features, clauses, and benefits of the claimed invention(s) will become apparent from the following detailed written description of the preferred embodiments and aspects taken in conjunction with the following drawings, although variations and modifications thereto may be effected without departing from the spirit and scope of the novel concepts of the disclosure.

What is claimed is:

1. A system, comprising:
a sensor configured to sense a pressure of a buffer tank; and
at least one computing device communicably coupled to the sensor, wherein the at least one computing device is configured to:
determine a start of dispensing a beverage from a beverage dispenser;
determine that an elapsed time from the start of dispensing the beverage reaches a predefined duration threshold;
measure a particular pressure of the buffer tank when determining that the elapsed time reaches the predefined duration threshold;
determine that the particular pressure falls below a predefined pressure threshold; and in response to the particular pressure at the elapsed time falling below the predefined pressure threshold, generate an order to replace a water filter of the beverage dispense.

2. The system of claim 1, wherein the at least one computing device is further configured to:
determine a second start of dispensing a second beverage from the beverage dispenser; and
determine whether a second elapsed time from the second start of dispensing the second beverage reaches the predefined duration threshold.

3. The system of claim 2, wherein the at least one computing device is further configured to in response to completion of dispensing the second beverage before the second elapsed time reaches the predefined duration threshold, refrain from measuring a pressure of the buffer tank.

4. The system of claim 2, wherein the at least one computing device is further configured to determine the start of dispensing the beverage from the beverage dispenser by:
receiving a demand pump run time and an end time;
converting the demand pump run time to seconds to determine a run time seconds; and
subtracting the run time seconds from the end time to determine a time of the start of dispensing.

5. The system of claim 4, wherein the demand pump run time and the end time are received from an inlet solenoid.

6. The system of claim 1, wherein the predefined pressure threshold is 10 pounds per square inch (PSI).

7. The system of claim 1, wherein a first computing device of the at least one computing device is configured to store data comprising a plurality of measurements at the beverage dispenser, and a second computing device of the at least one computing device is configured to:
read the data comprising the plurality of measurements; and
analyze the data to at least: determine the start of dispensing the beverage and determine that the particular pressure falls below the predefined pressure threshold.

8. The system of claim 7, wherein the beverage dispenser comprises the first computing device and the second computing device comprises a remote server.

9. A method, comprising:
determining, via one of one or more computing devices, a start of dispensing a beverage from a beverage dispenser;
determining, via one of the one or more computing devices, that an elapsed time from the start of dispensing the beverage reaches a predefined duration threshold;
measuring, via one of the one or more computing devices, a particular pressure of a buffer tank when determining that the elapsed time reaches the predefined duration threshold;
determining, via one of the one or more computing devices, that the particular pressure falls below a predefined pressure threshold; and
determining, via one of the one or more computing devices, to replace a water filter of the beverage dispenser based on the particular pressure at the elapsed time falling below the predefined pressure threshold.

10. The method of claim 9, further comprising:
determining, via one of the one or more computing devices, a volume of fluid dispensed from the beverage dispenser since the last time the water filter was replaced; and calculating, via one of the one or more computing devices, a volume per day value for the beverage dispenser.

11. The method of claim 10, further comprising generating, via one of the one or more computing devices, a plot of total volume dispensed versus pressure based on the volume per day value and the particular pressure.

12. The method of claim 9, wherein measuring the particular pressure of the buffer tank when determining that the elapsed time reaches the predefined duration threshold further comprises:

identifying, via one of the one or more computing devices, a particular measurement from a plurality of temporally sequential measurements recorded at a particular interval that is temporally closest to when the elapsed time reaches the predefined duration threshold.

13. The method of claim 12, further comprising determining that the particular measurement falls between the start of dispensing the beverage from the beverage dispenser and an end of dispensing the beverage from the beverage dispenser.

14. The method of claim 9, further comprising analyzing a plurality of recorded pressures to generate a prediction of a time when a pressure at the predefined duration threshold will pass the predefined pressure threshold, wherein the plurality of recorded pressures comprises the particular pressure.

15. The method of claim 14, further comprising receiving an indication of when the water filter was installed in the beverage dispenser, wherein the prediction of the time is generated based on the indication of when the water filter was installed in the beverage dispenser.

16. A system, comprising:

a sensor configured to sense a pressure of a buffer tank; and at least one computing device communicably coupled to the sensor, wherein the at least one computing device is configured to iteratively:

determine a respective start of dispensing a current iteration beverage from a beverage dispenser;

determine whether a respective elapsed time from the start of dispensing the current iteration beverage reaches a predefined duration threshold; and if the respective elapsed time reaches the predefined duration threshold:

measure a current iteration pressure of the buffer tank;

determine whether the current iteration pressure falls below a predefined pressure threshold; and if the current iteration pressure falls below the predefined pressure threshold, determine to replace a water filter of the beverage dispense.

17. The system of claim 16, wherein the at least one computing device is further configured to discard measurements related to a current iteration if the respective elapsed time fails to reach the predefined duration threshold.

18. The system of claim 16, wherein the at least one computing device is further configured to iteratively record a current iteration pressure as a plurality of recorded pressures when the respective elapsed time reaches the predefined duration threshold.

19. The system of claim 18, wherein the at least one computing device is further configured to generate a graph showing the plurality of recorded pressures over time.

20. The system of claim 18, wherein the at least one computing device is further configured to:

perform a regression analysis on the plurality of recorded pressures to determine a predictive formula for future pressure readings; and generate a prediction of a time when the pressure at the predefined duration threshold will pass the predefined pressure threshold based on the predictive formula.

* * * * *